Oct. 23, 1934.   W. D. ARCHEA   1,978,359
MILLING MACHINE
Filed July 1, 1930   2 Sheets-Sheet 1

Inventor
WALTER D. ARCHEA
By HK Parsons
Attorney

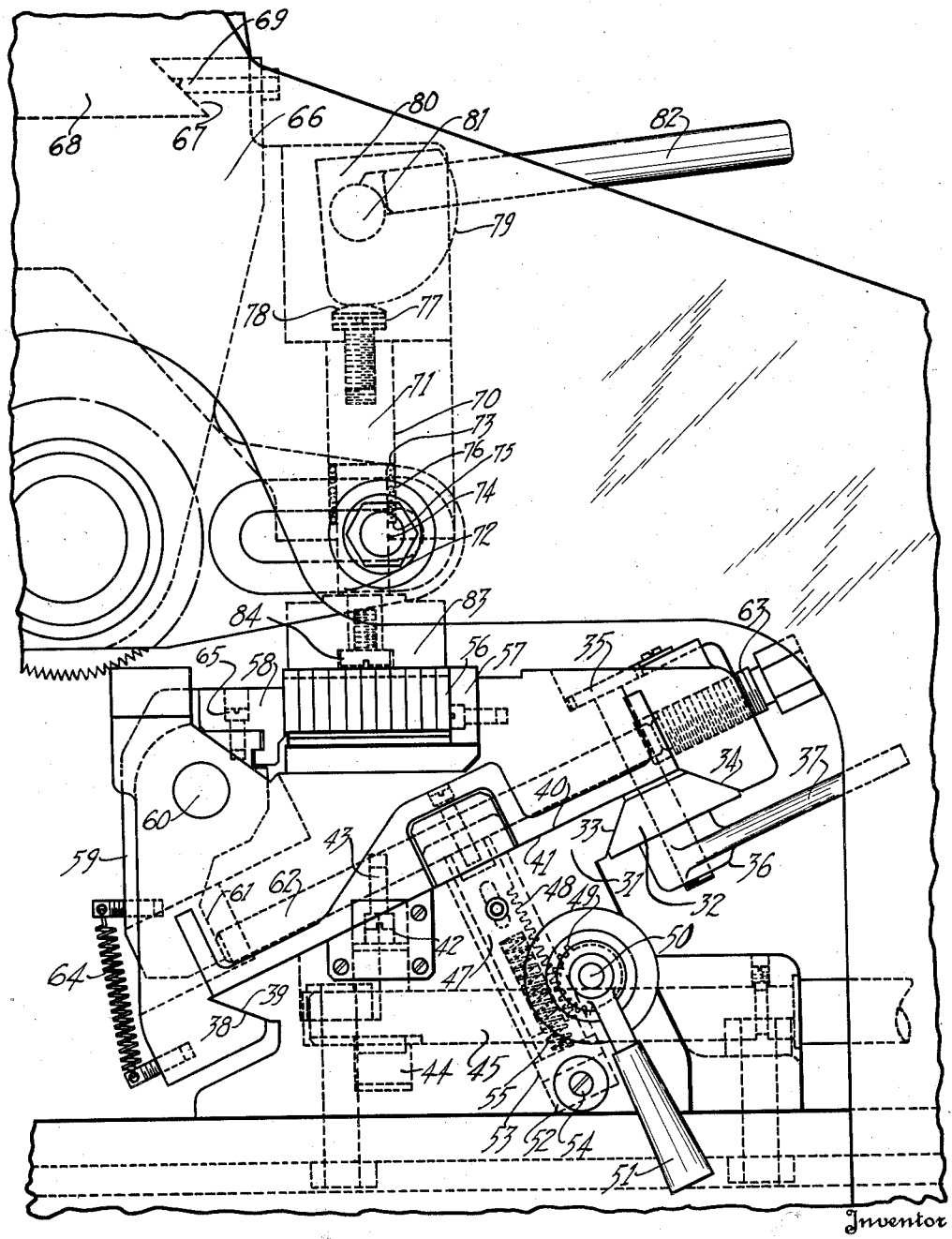

Patented Oct. 23, 1934

1,978,359

UNITED STATES PATENT OFFICE 1,978,359

MILLING MACHINE

Walter D. Archea, Norwood, Ohio, assignor to The Cincinnati Milling Machine Company, Cincinnati, Ohio, a corporation of Ohio Application July 1, 1930, Serial No. 465,168

8 Claims. (Cl. 90—3)

This invention relates to milling machines and more particularly to a machine suitable for cross milling long work pieces, such as racks, files or the like wherein a plurality of successive cross slots or grooves are formed throughout the length of the work piece.

One of the objects of this invention is to provide a milling machine with suitable positioning means whereby work pieces that are too long to be machined in a single operation may be longitudinally advanced with respect to the cutters to facilitate complete milling thereof during successive strokes of the table.

A further object of this invention is to provide means in conjunction with the work holder for maintaining warped or curved work pieces parallel to the surface of the work holder while being clamped in position for a machining operation.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 3 is an enlarged detail view of the work holder hold down clamp.

Figure 1:
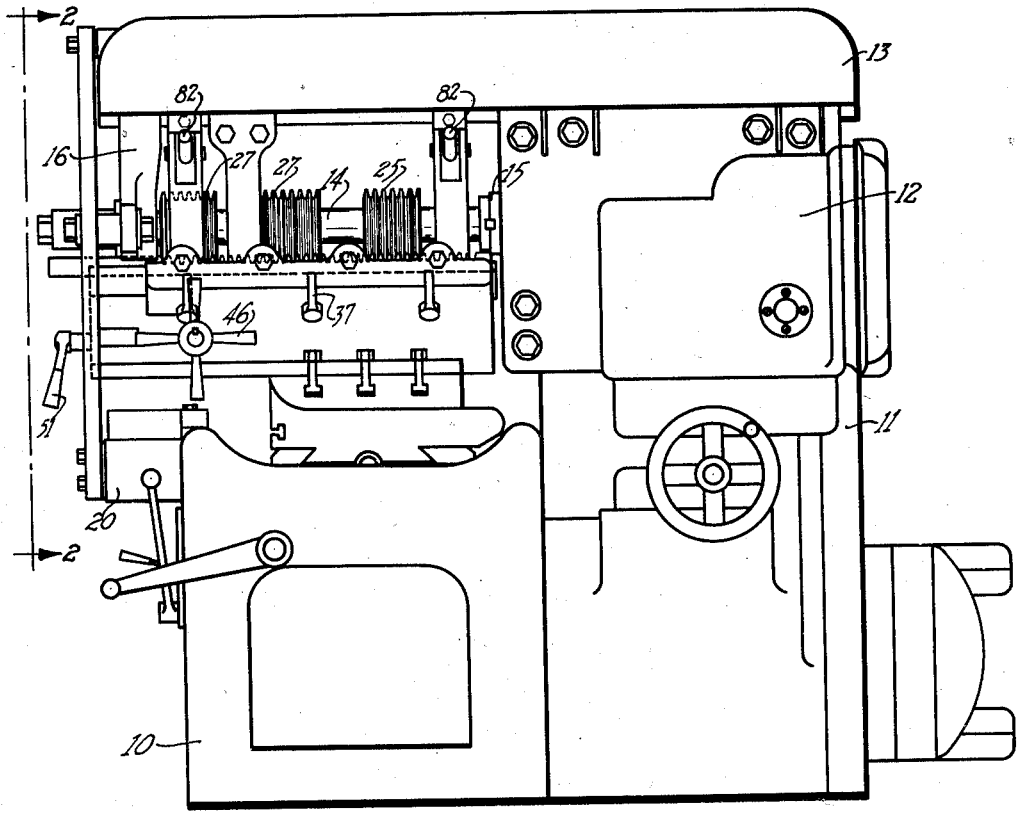
Figure 1 is an elevation of a milling machine embodying the principles of this invention.
Figure 2:
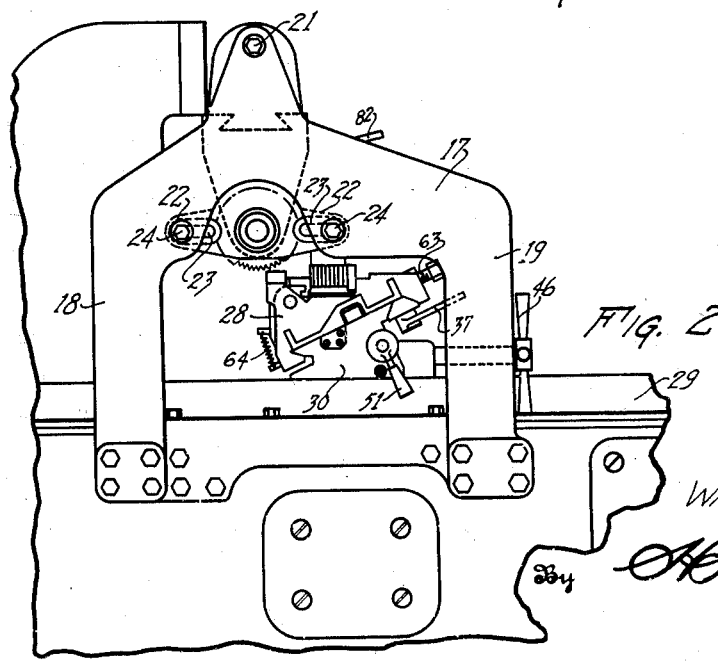
Figure 2 is an end view of the work holder and cutter supporting structure as viewed on the line 2—2 of Figure 1.

The reference numeral 10 indicates the base of a milling machine having a column 11 uprising therefrom and upon which is formed suitable vertical guideways for guiding the spindle carrier 12 upon the top of which is mounted the overarm 13. A cutter arbor 14 is attached at one end to the spindle 15 which is journaled in the spindle carrier for rotation by suitable known means. The outboard end of the arbor is journaled in a pendant 16 attached to the free end of the overarm 13. The pendant 16, as well as the overarm, is braced against lateral movement by the bridge type support 17 having two legs 18 and 19 which are bolted to a spacer block 20 which in turn is secured to the base 10. The overarm is attached to the support 17 by the bolt 21 and the pendant 16 is secured to the support by means of ears 22 having slots 23 formed therein for receiving locking means, such as the lock bolts 24 passed through the member 17. This results in a very rigid structure while the spacer blocks 20 permit the overarm and cutter spindle to appreciably overhang the work support, thus making it possible to mount the maximum length of cutters on the arbor 14.

In the machining of work in which it is necessary to form a plurality of laterally extending configurations in long work pieces, it is difficult if not almost impossible to effect the machining in a single operation upon ordinary machines where the work pieces are considerably longer than the work table is wide. This difficulty has been overcome in the present instance by providing a work table longitudinally shiftable to effect machining of one section or a plurality of spaced sections on the work held in a work holder and transversely moving the work holder with respect to the table to mill a succeeding section, or a plurality of intervening sections. In the present instance I have found it suitable to mill a plurality of spaced sections thereby making it possible to better support the cutter arbor while at the same time permitting the cutters to be made in sections which is less expensive and provides units that are more easily handled.

Certain types of work, such as rack bars for instance, require that the lateral cuts be equally spaced with a fair degree of precision and it is, therefore, necessary to space the sections so that the end cutting teeth of a cutter when cutting a second section will register with the end slots formed by the previous cut. To the furtherance of this purpose a plurality of cutters 25, 26 and 27 are mounted on the cutter arbor 14 at suitable spaced intervals in accordance with the requirements heretofore set forth. A work holder, indicated generally by the reference numeral 28, is slidably mounted upon a base member 30 attached to the worktable 29 which is mounted upon the bed 10 for reciprocation transversely of the cutters.

The base member 30 is provided with a transversely inclined dove-tailed guide way 31 for receiving the work holder 28 and a wedge member 32 is interposed between the beveled surface 33 of the base and the beveled surface 34 of the work support. A locking bolt 35 is passed through the work support and clamping member and has threaded on its projecting end the lock nut 36 provided with an operating handle 37. It is apparent that upon tightening of the nut 36 that the wedge 32 will draw the beveled surfaces 38 and 39 of the work holder and base, respectively, into engagement and at the same time draw the surfaces 40 and 41 into contact with one another. Thus the work holder is securely clamped to the base member. Upon counter rotation of the nut 36 the parts will be automatically loosened due to the fact that the surface 41 of the base member is inclined and gravity will cause the work holder to move along said face and thereby cause separation of the surfaces 38 and 39.

The transverse movement of the work holder with respect to the table is accomplished by securing a rack member 42 to the under surface of the work holder as by bolts 43, and journaling a pinion 44 in the base member in engagement with the rack. The pinion 44 is secured to the shaft 45 which is journaled in suitable bearings in the base member and has an exterior extension to which is keyed the handle 46 for manually shifting the work support. A locking plunger 47 is reciprocably mounted in the base member and provided with rack teeth 48 which are engaged by the gear 49 secured to the end of the shaft 50 which has the operating handle 51 secured to its opposite end. A plug 52 is held in the end of the bore 53, in which the plunger 47 is mounted, by a set screw 54 which engages a slot in the plug. A spring 55 is interposed between the plug and the plunger 47 for maintaining a constant urge outward on the plunger. The plunger is provided with a terminal member of suitable shape to engage index slots in the work holder.

A longitudinal work receiving slot 56 is provided in the work holder and in this instance the slot is provided with a fixed jaw 57 and a movable jaw 58. The movable jaw is secured to the end of the crank 59 pivoted at 60 in the work holder and provided with an angular face 61 which contacts with one end of the operating rod 62. A clamping screw 63 is threaded in the work holder into engagement with the opposite end of the rod 62 whereby upon rotation in one direction the rod 62 will be reciprocated to cause rotation of the crank 59 and thereby engagement of the jaw 58 with the work. A spring 64 is attached at one end to the arm 59 and at the other end to a fixed part of the work holder to insure disengagement of the jaw 58 from the work upon counter rotation of the locking screw 63. Attention is invited to the fact that the pivoted jaw 58 is pivoted to the end of the crank arm 59 by means of the screw 65 which permits the jaw 58 to properly align itself with the side of the work piece and also to the action of the crank arm whereby upon its rotation the jaw 58 is not only moved laterally toward the fixed jaw 57 but is also moved slightly downward due to rotation about the pivot 60 thereby exerting not only a lateral clamping action upon the work but also a slightly downward or drawing in action whereby the work is securely seated against the bottom of the work holding groove.

It has been noticed in practice that long work pieces have a tendency to warp or bow and especially is this true where lateral cuts have been made breaking the skin tension on one side of the work piece. It is, therefore, desirable in order to machine the opposite side for instance, to provide in combination with a work holder for long work pieces, suitable means for holding the pieces straight and to this end a hold down clamp has been provided which may be attached to the overarm of a milling machine and which is adapted to engage the work when the work table is in loading position to thereby hold the pieces straight while being secured in the holder. I have preferably formed this clamp of a body portion 66 having a dove-tailed guide way 67 by which it may be mounted upon the guide 68 of the overarm 13. Suitable set screws, such as 69, may be provided for clamping it in place. The body portion extends downward and laterally of the cutter arbor 14 and is provided with a vertical bore 70 in which is slidably mounted a plunger 71 having a reduced portion 72 thereby forming a shoulder 73. The bore 70 is reduced at 74 thereby forming a shoulder 75 in the bore. A spring 76 is interposed between this shoulder and the shoulder 73 of the plunger which tends to constantly urge the plunger upward. An adjusting screw 77 is threaded in the end of the plunger and has a hardened head 78 which is engaged by the cam surface 79 of the cam member 80 pivoted in the body 66 on the pin 81. The handle 82 is inserted into the member 80 for manual actuation thereof. The clamping block 83 is secured to the opposite end of the plunger by the set screw 84. Downward movement of the handle will exert pressure on the work and upward movement of the handle 83 will release the pressure on the member 78 and the spring 76 will hold the parts in normal position. Attention is invited to the fact that as many of these hold down clamps may be used as is desirable to suit the work in hand, for instance, if it were necessary to machine the concave side of a bowed work piece one may be used at each end while in milling the convex side the use of one in the middle would suffice.

A machine has thus been provided which is suitable for cross cutting slots, grooves or other configurations in long work pieces in one set-up by successive reciprocations with respect to the cutting element. Also a more rigid construction is provided for holding the work due to the inclination of the guideway, which is formed at such an angle as to absorb the reaction of the cutter and thereby prevent pivoting of the work holder about the base member during a cutting operation.

That which is claimed is:

1. A milling machine having a column, a cutter supporting structure including an overarm and a cutter arbor projecting in parallel relation from the column, a table supported on the column for movement transversely to the arbor, a work holder secured to the table, means to move the table and work holder to a loading position, means to open the work holder for receiving work, hold down clamps secured to the overarm in overhanging relation to said work holder when in loading position, means to move the clamps into engagement with work pieces for holding the work in parallel relation with the cutter arbor and means to clamp work in said work holder while being held by the clamps.

2. A milling machine having a reciprocating table, means for supporting a cutter arbor in cooperative relation thereto including an overarm having a longitudinal guideway thereon, a work holder attached to the table, means to move the table to a work loading position, a hold down clamp overlying said work holder, and having means for attachment to the guideway on said overarm, means to exert a downward pressure on said clamp to hold the surfaces to be machined of work pieces in parallel relation to the cutter arbor while the pieces are secured in the work holder, and automatic means to elevate said clamp clear of the work upon its release by the operator.

3. In a machine for cutting rack teeth on blank bars, the combination of a support, a reciprocating table mounted on the support, a rotatable cutter arbor journaled in the support and extending transversely of the table, a plurality of rack teeth cutters equally spaced along the arbor, the space between the cutters being slightly less than the width of the cutters, means adjacent the side of the table for supporting the outboard end of said spindle, means to support a blank bar transversely of the table in parallel relation to the cutter axis whereby movement of the table relative to the cutter will effect spaced groups of rack teeth on the blank bar transversely thereof, means to index the blank longitudinally across the table in parallel relation to the cutter arbor whereby the subsequent movement of the table will effect formation of rack teeth on the intervening blank spaces and in proper spaced relation to the previously formed groups of teeth whereby all the teeth may be cut in two reciprocations of the work relative to the cutter.

4. In a machine for cutting rack teeth on blank bars, the combination of a support, a reciprocating table mounted on the support, a rotatable cutter arbor journaled in the support and extending transversely of the table, a plurality of rack teeth cutters equally spaced along the arbor, the space between the cutters being slightly less than the width of the cutters, means adjacent the side of the table for supporting the outboard end of said spindle, means to support a blank bar transversely of the table in parallel relation to the cutter axis whereby movement of the table relative to the cutter will effect spaced groups of rack teeth on the blank bar transversely thereof, means to index the blank longitudinally across the table in parallel relation to the cutter arbor whereby the subsequent movement of the table will effect formation of rack teeth on the intervening blank spaces and in proper spaced relation to the previously formed groups of teeth whereby all the teeth may be cut in two reciprocations of the work relative to the cutter, said indexing means comprising spaced index slots formed in the blank bar supporting means, a locking plunger, means for reciprocating the plunger, and means to longitudinally move the work during withdrawal of the plunger.

5. A milling machine having a support, a cutter arbor journaled in the support, an overarm projecting from the support in parallel relation to the cutter arbor, a work holder, a table for moving the work holder transversely of the cutter arbor, and means mounted on the overarm for holding the surface of work positioned in the work holder in parallel relation to the surface of the table while the work is being clamped in the work holder.

6. A milling machine having a support, a cutter arbor journaled in the support, an overarm projecting from the support in parallel relation to the cutter arbor, a work holder, a table for moving the work holder transversely of the cutter arbor, means mounted on the overarm for holding the surface of work positioned in the work holder in parallel relation to the surface of the table while the work is being clamped in the work holder, said means comprising a housing having a guideway thereon for attachment to the overarm, a plunger reciprocably mounted in the housing, cam means for actuating the plunger in one direction to effect clamping of the work and resilient means for effecting withdrawal of the plunger upon release of said cam means.

7. A work holder for a milling machine having a base member for attachment to the work table thereof, said base member having a longitudinally extending guideway, the plane of said guideway being laterally inclined to the base, a work holder mounted on said guideway for movement longitudinally thereof, means adjacent the upper side of said guideway and movable in one direction for simultaneously effecting oblique ascension of the work holder transversely of the guideway and clamping the work holder to the guideway, said means being movable in the opposite direction to unclamp said work holder whereby the inclination of the guideway will cause lateral movement of the work holder to an unclamped position without further attention on the part of the operator.

8. A work holder for a milling machine having a base member for attachment to the work table thereof, said base member having a longitudinally extending guideway, the plane of said guideway being laterally inclined to the base, a work holder mounted on said guideway for movement longitudinally thereof, means adjacent the upper side of said guideway and movable in one direction for simultaneously effecting oblique ascension of the work holder transversely of the guideway and clamping the work holder to the guideway, said means being movable in the opposite direction to unclamp said work holder whereby the inclination of the guideway will cause lateral movement of the work holder to an unclamped position without further attention on the part of the operator, said means including a wedge-shaped member interposable between bevel faces on the base and work holder and manually operable means for moving the wedge-shaped member.

WALTER D. ARCHEA.